(12) United States Patent
Fukao et al.

(10) Patent No.: US 7,574,498 B2
(45) Date of Patent: Aug. 11, 2009

(54) DEVICE IDENTIFICATION INFORMATION MANAGING SYSTEM AND METHOD FOR COMMUNICABLY CONNECTING BETWEEN A NETWORK DEVICE AND A DEVICE MANAGING TERMINAL UNIT THAT MANAGES THE NETWORK DEVICE

(75) Inventors: Akihito Fukao, Suwa (JP); Toru Takahashi, Suwa (JP); Naruhide Kitada, Suwa (JP)

(73) Assignee: Seiko Epson Corporation (JP)

( * ) Notice: Subject to any disclaimer, the term of this patent is extended or adjusted under 35 U.S.C. 154(b) by 980 days.

(21) Appl. No.: 11/010,237

(22) Filed: Dec. 10, 2004

(65) Prior Publication Data

US 2005/0132029 A1 Jun. 16, 2005

(30) Foreign Application Priority Data

Dec. 12, 2003 (JP) ............................. 2003-414808
Aug. 31, 2004 (JP) ............................. 2004-252052

(51) Int. Cl.
*G06F 15/173* (2006.01)
(52) U.S. Cl. ..................... 709/223; 709/220; 709/222; 709/225
(58) Field of Classification Search .................. 709/223
See application file for complete search history.

(56) References Cited

U.S. PATENT DOCUMENTS 6,798,995 B2    9/2004  Nagata
7,362,461 B2 *  4/2008  Reddy et al. ............... 358/1.15
2002/0097431 A1 * 7/2002 Ikegami ..................... 358/1.15
2003/0078998 A1 * 4/2003 D'Estalenx ................. 709/330
2005/0086328 A1 * 4/2005 Landram et al. ............ 709/220
2006/0155619 A1 * 7/2006 Rhiando et al. ............... 705/35

FOREIGN PATENT DOCUMENTS

JP    2005-151704    5/2000
JP    2002-297969    10/2002

* cited by examiner

*Primary Examiner*—Larry D Donaghue
*Assistant Examiner*—Nicholas Taylor
(74) *Attorney, Agent, or Firm*—Harness, Dickey & Pierce, P.L.C.

(57) ABSTRACT

A device identification information managing system is provided. A network printer generates an extension device identifier depending upon dynamic information and a subject-of-registration-device identifier including a basic device identifier of the storage device and a generated extension device identifier, to send the generated subject-of-registration-device identifier to a printer managing server and notify the user. The printer managing server, when receiving a subject-of-registration-device identifier, tentatively registers the received subject-of-registration device identifier to the storage device. When a collating device identifier is received, the received collating device identifier is collated with the subject-of-registration-device identifier of the storage device. Depending upon the collation result, the subject-of-registration-device identifier is registered to the storage device.

8 Claims, 6 Drawing Sheets ically to a device identification information managing system, network device, device managing terminal unit, device and terminal-unit programs and device identification information managing method which are suited for handling device identifiers with security.

DEVICE IDENTIFICATION INFORMATION MANAGING SYSTEM AND METHOD FOR COMMUNICABLY CONNECTING BETWEEN A NETWORK DEVICE AND A DEVICE MANAGING TERMINAL UNIT THAT MANAGES THE NETWORK DEVICE

RELATED APPLICATIONS

This application claims priority to Japanese Patent Application Nos. 2003-414808 filed Dec. 12, 2003 and 2004-252052 filed Aug. 31, 2004 which are hereby expressly incorporated by reference herein in their entirety.

BACKGROUND

1. Technical Field

The present invention relates to a system, device, terminal unit, program and method for managing device identifiers, and more particularly to a device identification information managing system, network device, device managing terminal unit, device and terminal-unit programs and device identification information managing method which are suited for handling device identifiers with security.

2. Related Art

Where a service-providing server provides a network service such as a content distribution service to network devices, the service-providing server previously stores device identifiers based on each of the network devices. Prior to providing the network service, the service-providing server confirms the device identifiers with the network devices and determines eligibility for enjoying a network service provided during communication.

Conventionally, the device identifier managing methods include, first, a method that the user inputs a device identifier of the network device to the service-providing server so that the inputted device identifier can be registered. Second, there is also a method that, when the network device accesses the service-providing server, the service-providing server automatically recognizes a device identifier of the network device to thereby register the recognized device identifier. Third, there is a method that, when the network device accesses the service-providing server, the network device provides its own device identifier to the service-providing server in response to a provision request from the service-providing server, thereby registering the device identifier provided.

Furthermore, JP-A-2000-151704 also discloses a method of managing device identifiers. In this document, the service-providing server occasionally issues device identifiers to the accessing network devices thus providing network services made specific based on each of the network devices.

In such a network system, device identifiers are problematic in terms of security. Security is meant to prevent a device identifier from being stolen by a third person and to guarantee a device identifier as a registration based on the user's intention.

However, both the first and third managing methods are to utilize the device identifiers previously assigned to the network devices. Consequently, should the device identifier be known to a third person, the device identifier is possibly stolen by a third person and the device identifier is possibly registered without relying upon a user's intention.

Meanwhile, the invention described in JP-A-2000-151704 makes use of the device identifier issued from the service-providing server. When the device identifier is known to a third person, the device identifier is possibly registered without relying upon a user's intention.

Therefore, the present invention has been made in view of such unsolved problems involved in the prior art, and it is an object to provide a device identification information managing system, network device, device managing terminal unit, device and terminal-unit programs and device identification information managing method which are suited for handling device identifiers with security.

SUMMARY

To achieve the foregoing object, a device identification information managing system of aspect 1 is a system for communicably connecting between a network device and a device managing terminal unit that manages the network device, and managing device identification information to identify any network device and an attribute of the network device, wherein, the network device comprises:

basic device identification information storage means for storing basic device identification information to identify the network device or an attribute thereof;

extension device identification information generating means for generating extension device identification information to identify the network device or an attribute thereof depending upon dynamic information;

subject-of-registration-device identification information transmitting means for sending subject-of-registration-device identification information including basic device identification information of the basic device identification information storage means and extension device identification information generated by the extension device identification information generating means to the device managing terminal unit; and subject-of-registration-device identification information notifying means for notifying the subject-of-registration-device identification information; and the device managing terminal unit comprises:

subject-of-registration-device identification information receiving means for receiving the subject-of-registration-device identification information;

subject-of-registration-device identification information first-registering means for registering the subject-of-registration-device identification information received by the subject-of-registration-device identification information receiving means to first-registering storage means;

collating device identification information input means for inputting collating device identification information;

device identification information collating means for collating between the collating device identification information inputted by the collating device identification information input means and subject-of-registration-device identification information of the first-registering storage means; and subject-of-registration-device identification information second-registering means for registering the subject-of-registration-device identification information to the subject-of-registration-device identification information storage means depending upon a collation result by the device identification information collating means.

With this configuration, at the network device, the extension device identification information generating means generates extension device identification information depending upon dynamic information while the subject-of-registration-device identification information transmitting means sends, to the device managing terminal unit, subject-of-registration-device identification information including the basic device identification information of the basic device identification information storage means and the generated extension device identification information.

At the device managing terminal unit, when the subject-of-registration-device identification information receiving means receives the subject-of-registration-device identification information, the subject-of-registration-device identification information first-registering means first-registers (tentatively registers) the received subject-of-registration-device identification information to the first-registering storage means.

Meanwhile, the network device is notified of the subject-of-registration-device identification information by the subject-of-registration-device identification information notifying means. The user makes a note or the like of the notified subject-of-registration-device identification information and inputs it as collating device identification information directly or via a network, etc. to the device managing terminal unit.

At the device managing terminal unit, when the collating device identification information input means inputs the collating device identification information, the device identification information collating means collates between the input collating device identification information and the subject-of-registration-device identification information of the first-registering storage means. Then, the subject-of-registration-device identification information second-registering means regularly registers the subject-of-registration-device identification information to the subject-of-registration-device identification information storage means depending upon the result of collation.

Due to this, the subject-of-registration-device identification information is utilized including the extension device identification information generated based on the dynamic information, besides the basic device identification information. Accordingly, should the basic device identification information be known to a third person, there can be a reduced possibility for the third person to fake and illicitly use the subject-of-registration-device identification information.

Meanwhile, it is difficult for a person other than the user to be notified of the subject-of-registration-device identification information. Furthermore, unless the subject-of-registration-device identification information is inputted to the device managing terminal unit, the subject-of-registration-device identification information is not to be registered. Accordingly, there can be a reduced possibility to register the subject-of-registration-device identification information without relying upon a user's intention.

Therefore, it is possible to obtain an effect that device identification information can be handled comparatively securely as compared to conventional techniques.

Here, "device identification information" may be anything provided that is information for identifying a network device or an attribute thereof, e.g., to be represented by a character, a numeral, a figure, a sign, a symbol or a color or a combination of these.

Meanwhile, "network device attribute" includes a type or user of a network device. In the following, this is true for the network device of aspect 8, the device managing terminal unit of aspect 14, the device program of aspect 17, the terminal-unit program of aspect 23 and the device identification information managing method of aspect 26 and 32.

Meanwhile, "dynamic information" is information whose content is to be dynamically determined during execution, which can utilize, for example, a random number value, a timer value and information changing with the state of a network device (temperature, output quantity or the like). In the following, this is true for the network device of aspect 8, the device program of aspect 17 and the device identification information managing method of aspect 26 and 33.

Meanwhile, the "device identification information collating means" may be in any configuration provided that is adapted to collate between collating device identification information and subject-of-registration-device identification information. The collation process includes a process to determine whether or not a predetermined relationship is satisfied between the collating device identification information and the subject-of-registration-device identification information.

Here, "satisfying a predetermined relationship" includes, for example, agreement between the collating device identification information and the subject-of-registration-device identification information, agreement of a result of operation on a predetermined operation expression by use of the collating device identification information with the subject-of-registration-device identification information, agreement of a result of operation on a predetermined operation expression by use of the subject-of-registration-device identification information with the collating device identification information, and agreement between a result of operation on a predetermined operation expression by use of the collating device identification information with a result of operation on a predetermined operation expression by use of the subject-of-registration-device identification information. In the following, this is true for the device managing terminal unit of aspect 14 and the terminal-unit program of aspect 23.

Meanwhile, the tentative registering storage means can utilize a provision in anything, e.g., can utilize a provision in the device managing terminal unit, the network device or another terminal unit. This is applicable also for the subject-of-registration-device identification information storage means. In the following, this is true for the device managing terminal unit of aspect 14, the terminal-unit program of aspect 23 and the device-identifying information managing method of aspect 26.

Meanwhile, the "basic device identification information storage means" may be to store basic device identification information by any means and at any time. It may be to previously store basic device identification information or to store basic device identification information by external input or the like during operation of the present system without previously storing basic device identification information. In the following, this is true for the network device of aspect 8.

Meanwhile, the form the network device is to connect for communication includes not only direct connection between the device managing terminal unit and the network device but also indirect connection between the device managing terminal unit and the network device through other communication terminal units, communication instruments or other communication equipment. In the following, this is true for the network device of aspect 8, the device managing terminal unit of aspect 14, the device program of aspect 17, the terminal-unit program of aspect 23 and the device identification information managing method of aspect 26.

Meanwhile, the device managing terminal unit may be realized as a single terminal unit or as a network system that a plurality of terminal units are connected for communication. In the latter case, the constituent elements may belong to any of the plurality of terminal units provided that they are each connected for communication. For example, in the case of configuring a device managing terminal unit by communicably connecting between two terminal units, it can be considered that a first device managing terminal unit is provided with subject-of-registration-device identification information receiving means and subject-of-registration-device identification information first-registering means while a second device managing terminal unit is provided with collating device identification information input means, device identification information collating means and subject-of-registration-device identification information second-registering means. In the following, this is true for the network device of aspect 8, the device managing terminal unit of aspect 14, the device program of aspect 17 and the terminal-unit program of aspect 23.

Meanwhile, the "network device" has an output function (specifically, the subject-of-registration-device identification information notifying means or the like) to output at least data, e.g., corresponding to a network-compatible printer, projector, scanner or the like. In the following, this is true for the network device of aspect 8, the device program of aspect 17 and the device identification information managing method of aspect 26 and 33.

Meanwhile, the device identification information referred to herein is possibly to identify a network device itself, to identify an attribute of a network device or further to identify both. In the following, this is true for the network device of aspect 8, the device program of aspect 17 and the device identification information managing method of aspect 26 and 33.

Furthermore, a device identification information managing system of aspect 2 is according to the device identification information managing system of aspect 1, wherein the extension device identification information generating means is to generate the extension device identification information depending upon dynamic information changing with a state of the network device.

With this configuration, at the network device, the extension device identification information generating means generates extension device identification information depending upon dynamic information changing with a state of the network device.

Because this makes it difficult to fake extension device identification information, there can be a reduced possibility for the third person to fake and illicitly use a subject-of-registration-device identifier. Therefore, it is possible to obtain an effect that device identification information can be handled with further security.

Furthermore, a device identification information managing system of aspect 3 is according to the device identification information managing system of aspect 2, wherein the extension device identification information generating means is to generate the extension device identification information depending upon a startup lapse time from a startup of the network device to a present time.

With this configuration, at the network device, the extension device identification information generating means generates extension device identification information depending upon a startup lapse time from a startup of the network device to a present time.

Because this makes it difficult to fake extension device identification information, there can be a reduced possibility for the third person to fake and illicitly use a subject-of-registration-device identifier. Therefore, it is possible to obtain an effect that device identification information can be handled with further security.

Note that "startup" referred in the invention refers to the state that the network device is powered on and the extension device identification information generating means is made operable normally, for example.

Meanwhile, the extension device identification information generating method by the "extension device identification information generating means", although not especially limited, can be considered as a method of using, as it is, the dynamic information unique to the network device or utilizing a numeral that such dynamic information is added, subtracted, multiplied or divided with a certain constant, for example. Particularly explaining the former method, where the dynamic information employs a startup lapse time of the network device, provided that the startup lapse time is six hours, the numeral "21600" as a conversion thereof into seconds is taken as extension device identification information. Meanwhile, particularly explaining the latter method, the network device as a printer and total print count is employed as its dynamic information. In case the total print count is assumed 120, the same 120 is added, multiplied or divided for example by a constant 2 the resulting numeral of which is taken as extension device identification information.

Furthermore, a device identification information managing system of aspect 4 is according to any of the device identification information managing systems of aspects 2 and 3, wherein the network device further comprises output means, the extension device identification information generating means being to generate extension device identification information depending upon an output amount of the output means from a predetermined reference time to a present time.

With this configuration, at the network device, the extension device identification information generating means generates extension device identification information depending upon an output amount of the output means from a predetermined reference time to a present time.

Because this makes it difficult to fake extension device identification information, there can be a reduced possibility for the third person to fake and illicitly use a subject-of-registration-device identifier. Therefore, it is possible to obtain an effect that device identification information can be handled with further security.

Here, the "output means" refers to a paper eject mechanism where the network device is a printer, to an image projection where the network device is a projector, and to a scanned image output where the network device is a scanner, for example.

Meanwhile, "output amount" refers to an output sheet count, toner/ink quantity, etc. where the network device is a printer, to a projection image size and time where the network device is a projector, and to a scanned image sheet count and image size where the network device is a scanner, for example.

Meanwhile, elements other than the output amount include, for example, 1. operation or use ratio that operation time is divided by total startup time, 2. error ratio that error occurrences are divided by total drive count, success ratio that normal operations are divided by total drive time, and so on.

Furthermore, a device identification information managing system of aspect 5 is according to any of the device identification information managing systems of aspects 1 to 3, wherein the network device further comprises output means, the subject-of-registration-device identification information notifying means being to notify the subject-of-registration-device identification information by utilization of an output function of the output means.

With this configuration, at the network device, the subject-of-registration-device identification information notifying means notifies subject-of-registration-device identification information by utilization of an output function of the output means.

Because this merely utilizes the output function of the network device, there can be obtained an effect that subject-of-registration-device identification information can be notified comparatively easily.

Furthermore, a device identification information managing system of aspect 6 is according to any of the device identification information managing systems of aspects 1 to 5, wherein the network device further has subject-of-registration-device identification information encrypting means for encrypting the subject-of-registration-device identification information; the subject-of-registration-device identification information transmitting means being to send device identification information encrypted by the subject-of-registration-device identification information encrypting means to the device managing terminal unit, the device managing terminal unit further comprising subject-of-registration-device identification information decrypting means for decrypting encrypted device identification information received by the subject-of-registration-device identification information receiving means, the subject-of-registration-device identification information first-registering means being to register subject-of-registration-device identification information decrypted by the subject-of-registration-device identification information decrypting means to the first-registering storage means.

With this configuration, at the network device, subject-of-registration-device identification information encrypting means encrypts the subject-of-registration-device identification information while the subject-of-registration-device identification information transmitting means sends device identification information encrypted by the subject-of-registration-device identification information encrypting means to the device managing terminal unit.

At the device managing terminal unit, when the subject-of-registration-device identification information receiving means receives the encrypted device identification information, subject-of-registration-device identification information decrypting means decrypts the received encrypted device identification information. The subject-of-registration-device identification information first-registering means registers subject-of-registration-device identification information decrypted by the subject-of-registration-device identification information decrypting means to the first-registering storage means.

Due to this, subject-of-registration-device identification information is transferred on cipher communication at between the network device and the device managing terminal unit. Accordingly, should subject-of-registration-device identification information be stolen in the course of communication, there can be a reduced possibility for the third person to fake and illicitly use a subject-of-registration-device identifier. Therefore, it is possible to obtain an effect that device identification information can be handled with further security.

Furthermore, a device identification information managing system of aspect 7 is according to any of the device identification information managing systems of aspects 1 to 6, wherein the device managing terminal unit further comprises collating device identification information decrypting means for decrypting collating device identification information inputted by the collating device identification information input means, the device identification information collating means being to collate between collating device identification information decrypted by the collating device identification information decrypting means and subject-of-registration-device identification information of the first-registering storage means.

With this configuration, the user encrypts the notified subject-of-registration-device identification information and inputs it as collating device identification information to the device managing terminal unit directly or via a network or the like.

At the device managing terminal unit, when the collating device identification information input means inputs the collating device identification information, the collating device identification information decrypting means decrypts the inputted collating device identification information. The device identification information collating means collates between the decrypted collating device identification information and the subject-of-registration-device identification information of the first-registering storage means.

Due to this, collating device identification information is inputted by encryption. Accordingly, should collating device identification information be stolen in the course of inputting, there can be a reduced possibility for the third person to fake and illicitly use a subject-of-registration-device identifier. Therefore, it is possible to obtain an effect that device identification information can be handled with further security.

Meanwhile, in order to achieve the foregoing object, a network device of aspect 8 is a device for communicable connection to a device managing terminal unit, the network device comprising: basic device identification information storage means for storing basic device identification information to identify the network device or an attribute thereof; extension device identification information generating means for generating extension device identification information to identify the network device or an attribute thereof depending upon dynamic information; subject-of-registration-device identification information transmitting means for sending subject-of-registration-device identification information including basic device identification information of the basic device identification information storage means and extension device identification information generated by the extension device identification information generating means to the device managing terminal unit; and subject-of-registration-device identification information notifying means for notifying the subject-of-registration-device identification information.

With this configuration, it is possible to obtain an operation equivalent to the network device of the device identification information managing system of aspect 1. Accordingly, it is possible to obtain an effect equivalent to the device identification information managing system of aspect 1.

Furthermore, a network device of aspect 9 is according to the network device of aspect 8, wherein the extension device identification information generating means is to generate the extension device identification information depending upon dynamic information changing with a state of the network device.

With this configuration, it is possible to obtain an operation equivalent to the network device of the device identification information managing system of aspect 2. Accordingly, it is possible to obtain an effect equivalent to the device identification information managing system of aspect 2.

Furthermore, a network device of aspect 10 is according to the network device of aspect 9, wherein the extension device identification information generating means is to generate the extension device identification information depending upon a startup lapse time from a startup of the network device to a present time.

With this configuration, it is possible to obtain an operation equivalent to the network device of the device identification information managing system of aspect 3. Accordingly, it is possible to obtain an effect equivalent to the device identification information managing system of aspect 3.

Furthermore, a network device of aspect 11 is according to any of the network devices of aspects 9 and 10, wherein the network device further comprises output means, the extension device identification information generating means being to generate extension device identification information depending upon an output amount of the output means from a predetermined reference time to a present time.

With this configuration, it is possible to obtain an operation equivalent to the network device of the device identification information managing system of aspect 4. Accordingly, it is possible to obtain an effect equivalent to the device identification information managing system of aspect 4.

Furthermore, a network device of aspect 12 is according to any of the network devices of aspects 8 to 11, wherein the network device further comprises output means, the subject-of-registration-device identification information notifying means being to notify the subject-of-registration-device identification information by utilization of an output function of the output means.

With this configuration, it is possible to obtain an operation equivalent to the network device of the device identification information managing system of aspect 5. Accordingly, it is possible to obtain an effect equivalent to the device identification information managing system of aspect 5.

Furthermore, a network device of aspect 13 is according to any of the network devices of aspects 8 to 12, further having subject-of-registration-device identification information encrypting means for encrypting the subject-of-registration-device identification information; the subject-of-registration-device identification information transmitting means being to send device identification information encrypted by the subject-of-registration-device identification information encrypting means to the device managing terminal unit.

With this configuration, it is possible to obtain an operation equivalent to the network device of the device identification information managing system of aspect 6. Accordingly, it is possible to obtain an effect equivalent to the device identification information managing system of aspect 6.

Meanwhile, in order to achieve the foregoing object, a device managing terminal unit of aspect 14 is a terminal unit for communicable connection to a network device and managing the network device, the terminal unit comprising: subject-of-registration-device identification information receiving means for receiving the subject-of-registration-device identification information; subject-of-registration-device identification information first-registering means for first-registering the subject-of-registration-device identification information received by the subject-of-registration-device identification information receiving means to first-registering storage means; collating device identification information input means for inputting collating device identification information; device identification information collating means for collating between the collating device identification information inputted by the collating device identification information input means and subject-of-registration-device identification information of the first-registering storage means; and subject-of-registration-device identification information second-registering means for registering the subject-of-registration-device identification information to the subject-of-registration-device identification information storage means depending upon a collation result by the device identification information collating means.

With this configuration, it is possible to obtain an operation equivalent to the device managing terminal unit of the device identification information managing system of aspect 1. Accordingly, it is possible to obtain an effect equivalent to the device identification information managing system of aspect 1.

Furthermore, a device managing terminal unit of aspect 15 is according to the device managing terminal unit of aspect 14, further comprising subject-of-registration-device identification information decrypting means for decrypting encrypted device identification information received by the subject-of-registration-device identification information receiving means, the subject-of-registration-device identification information first-registering means being to register subject-of-registration-device identification information decrypted by the subject-of-registration-device identification information decrypting means to the first-registering storage means.

With this configuration, it is possible to obtain an operation equivalent to the device managing terminal unit of the device identification information managing system of aspect 6. Accordingly, it is possible to obtain an effect equivalent to the device identification information managing system of aspect 6.

Furthermore, a device managing terminal unit of aspect 16 is according to any of the device managing terminal units of aspects 14 and 15, further comprising collating device identification information decrypting means for decrypting collating device identification information inputted by the collating device identification information input means, the device identification information collating means being to collate between collating device identification information decrypted by the collating device identification information decrypting means and subject-of-registration-device identification information of the first-registering storage means.

With this configuration, it is possible to obtain an operation equivalent to the device managing terminal unit of the device identification information managing system of aspect 7. Accordingly, it is possible to obtain an effect equivalent to the device identification information managing system of aspect 7.

Meanwhile, in order to achieve the foregoing object, a device program of aspect 17 is a program for a computer communicably connected to a device managing terminal unit to execute, the program being for executing a process to be realized as: an extension device identification information generating step of generating extension device identification information to identify the computer or an attribute thereof depending upon dynamic information; a subject-of-registration-device identification information transmitting step of sending subject-of-registration-device identification information including basic device identification information of the basic device identification information storing step storing basic device identification information to identify the computer or an attribute thereof and extension device identification information generated by the extension device identification information generating step to the device managing terminal unit; and subject-of-registration-device identification information notifying step of notifying the subject-of-registration-device identification information.

With this configuration, in case the computer reads out the program and the computer executes a process according to the read-out program, it is possible to obtain an operation and effect equivalent to the network device of aspect 8.

Furthermore, a device program of aspect 18 is according to the device program of aspect 17, wherein the extension device identification information generating step is to generate the extension device identification information depending upon dynamic information changing with a state of the computer.

With this configuration, in case the computer reads out the program and the computer executes a process according to the read-out program, it is possible to obtain an operation and effect equivalent to the network device of aspect 9.

Furthermore, a device program of aspect 19 is according to the device program of aspect 18, wherein the extension device identification information generating step is to generate the extension device identification information depending upon a startup lapse time from a startup of the computer to a present time.

With this configuration, in case the computer reads out the program and the computer executes a process according to the read-out program, it is possible to obtain an operation and effect equivalent to the network device of aspect 10.

Furthermore, a device program of aspect 20 is according to any of the device programs of aspects 18 and 19, wherein the computer further comprises output means, the extension device identification information generating step being to generate extension device identification information depending upon an output amount of the output step from a predetermined reference time to a present time.

With this configuration, in case the computer reads out the program and the computer executes a process according to the read-out program, it is possible to obtain an operation and effect equivalent to the network device of aspect 11.

Furthermore, a device program of aspect 21 is according to any of the device programs of aspects 17 to 20, wherein the computer comprises an output step, the subject-of-registration-device identification information notifying step being to notify the subject-of-registration-device identification information by utilization of an output function of the output step.

With this configuration, in case the computer reads out the program and the computer executes a process according to the read-out program, it is possible to obtain an operation and effect equivalent to the network device of aspect 12.

Furthermore, a device program of aspect 22 is according to any of the device programs of aspects 17 to 21, further including a program for executing a program to be realized as a subject-of-registration-device identification information encrypting step of encrypting the subject-of-registration-device identification information; the subject-of-registration-device identification information transmitting step is to send device identification information encrypted by the subject-of-registration-device identification information encrypting step to the device managing terminal unit.

With this configuration, in case the computer reads out the program and the computer executes a process according to the read-out program, it is possible to obtain an operation and effect equivalent to the network device of aspect 13.

Meanwhile, in order to achieve the foregoing object, a terminal-unit program of aspect 23 for a computer communicably connected with a network device and managing the network device to execute, the program being for executing a process to be realized as: a subject-of-registration-device identification information receiving step of receiving the subject-of-registration-device identification information; a subject-of-registration-device identification information first-registering step of registering the subject-of-registration-device identification information received by the subject-of-registration-device identification information receiving step to first-registering storing step; a collating device identification information input step of inputting collating device identification information; a device identification information collating step of collating the collating device identification information inputted by the collating device identification information input step with subject-of-registration-device identification information of the first-registering storing step; and a subject-of-registration-device identification information second-registering step of registering the subject-of-registration-device identification information to the subject-of-registration-device identification information storing step depending upon a collation result by the device identification information collating step.

With this configuration, in case the computer reads out the program and the computer executes a process according to the read-out program, it is possible to obtain an operation and effect equivalent to the device managing terminal unit of aspect 14.

Furthermore, a terminal-unit program of aspect 24 is according to the terminal-unit program of aspect 23, further including a program for executing a process to be realized as a subject-of-registration-device identification information decrypting step of decrypting the encrypted device identification information received in the subject-of-registration-device identification information receiving step; the subject-of-registration-device identification information first-registering step being to register the subject-of-registration-device identification information decrypted by the subject-of-registration-device identification information decrypting step to first-registering storage step.

With this configuration, in case the computer reads out the program and the computer executes a process according to the read-out program, it is possible to obtain an operation and effect equivalent to the device managing terminal unit of aspect 15.

Furthermore, a terminal-unit program of aspect 25 is according to any of the terminal-unit programs of aspects 23 and 24, further including a program for executing a program to be realized as a collating device identification information decrypting step of decrypting the collating device identification information inputted by the collating device identification information input step; the device identification information collating step being to collate between the collating device identification information decrypted by the collating device identification information decrypting step and the subject-of-registration-device identification information of the first-registering storage step.

With this configuration, in case the computer reads out the program and the computer executes a process according to the read-out program, it is possible to obtain an operation and effect equivalent to the device managing terminal unit of aspect 16.

Meanwhile, in order to achieve the foregoing object, a device identification information managing method of aspect 26 is a method for communicably connecting between a network device and a device managing terminal unit that manages the network device, and managing device identification information to identify any network device and an attribute of the network device, the method comprising: for the network device, an extension device identification information generating step of generating extension device identification information to identify the network device or an attribute thereof depending upon dynamic information; a subject-of-registration-device identification information transmitting step of sending subject-of-registration-device identification information including basic device identification information of the basic device identification information storage means for storing the basic device identification information to identify the network device or an attribute thereof and extension device identification information generated by the extension device identification information generating step to the device managing terminal unit; and a subject-of-registration-device identification information notifying step of notifying the subject-of-registration-device identification information;

and for the device managing terminal unit, a subject-of-registration-device identification information receiving step of receiving the subject-of-registration-device identification information; a subject-of-registration-device identification information first-registering step of registering the subject-of-registration-device identification information received by the subject-of-registration-device identification information receiving step to first-registering storing step; a collating device identification information input step of inputting collating device identification information; a device identification information collating step of collating the collating device identification information inputted by the collating device identification information input step with subject-of-registration-device identification information of the first-registering storing step; and a subject-of-registration-device identification information registering step of registering the subject-of-registration-device identification information to the subject-of-registration-device identification information storing step depending upon a collation result by the device identification information collating step.

Due to this, it is possible to obtain an effect equivalent to the device identification information managing system of aspect 1.

Here, the device identification information collating step may be of any method provided that is to collate between the collating device identification information and the subject-of-registration-device identification information. The collation method includes a method to determine whether or not a predetermined relationship is satisfied between the collating device identification information and the subject-of-registration-device identification information. Here, "satisfying a predetermined relationship" includes, for example, agreement between the collating device identification information and the subject-of-registration-device identification information, agreement of a result of operation on a predetermined operation expression by use of the collating device identification information with the subject-of-registration-device identification information, agreement of a result of operation on a predetermined operation expression by use of the subject-of-registration-device identification information with the collating device identification information, and agreement between a result of operation on a predetermined operation expression by use of the collating device identification information with a result of operation on a predetermined operation expression by use of the subject-of-registration-device identification information.

Furthermore, a device identification information managing method of aspect 27 is according to the device identification information managing method of aspect 26, wherein the extension device identification information generating step is to generate the extension device identification information depending upon dynamic information changing with a state of the network device.

Due to this, it is possible to obtain an effect equivalent to the device identification information managing system of aspect 2.

Furthermore, a device identification information managing method of aspect 28 is according to the device identification information managing method of aspect 27, wherein the extension device identification information generating step is to generate the extension device identification information depending upon a startup lapse time from a startup of the network device to a present time.

Due to this, it is possible to obtain an effect equivalent to the device identification information managing system of aspect 3.

Furthermore, a device identification information managing method of aspect 29 is according to any of the device identification information managing methods of aspects 27 and 28, wherein the network device further comprises output means, the extension device identification information generating step being to generate extension device identification information depending upon an output amount of the output means from a predetermined reference time to a present time.

Due to this, it is possible to obtain an effect equivalent to the device identification information managing system of aspect 4.

Furthermore, a device identification information managing method of aspect 30 is according to any of the device identification information managing methods of aspects 26 to 29, wherein the network device further comprises output means, the subject-of-registration-device identification information notifying step being to notify the subject-of-registration-device identification information by utilization of an output function of the output means.

Due to this, it is possible to obtain an effect equivalent to the device identification information managing system of aspect 5.

Furthermore, a device identification information managing method of aspect 31 is according to any of the device identification information managing methods of aspects 26 to 30, further including, for the network device, a subject-of-registration-device identification information encrypting step of encrypting the subject-of-registration-device identification information; the subject-of-registration-device identification information transmitting step being to send device identification information encrypted by the subject-of-registration-device identification information encrypting step to the device managing terminal unit, for the device managing terminal unit, a subject-of-registration-device identification information decrypting step of decrypting encrypted device identification information received by the subject-of-registration-device identification information receiving step, the subject-of-registration-device identification information first-registering step being to register subject-of-registration-device identification information decrypted by the subject-of-registration-device identification information decrypting step to the first-registering storage means.

Due to this, it is possible to obtain an effect equivalent to the device identification information managing system of aspect 6.

Furthermore, a device identification information managing method of aspect 32 is according to any of the device identification information managing methods of aspects 26 to 31, further including, for the device managing terminal unit, a collating device identification information decrypting step of decrypting collating device identification information inputted by the collating device identification information input step, the device identification information collating step being to collate between collating device identification information decrypted by the collating device identification information decrypting step and subject-of-registration-device identification information of the first-registering storage step.

Due to this, it is possible to obtain an effect equivalent to the device identification information managing system of aspect 7.

Furthermore, a device identification information managing method of aspect 33 is a method for communicably connecting between a network device and a device managing terminal unit that manages the network device, and managing device identification information to identify any network device and an attribute of the network device, the method comprising: generating extension device identification information for identifying the network device or an attribute thereof depending upon dynamic information, to send to the device managing terminal unit subject-of-registration-device identification information including the extension device identification information and basic device identification information for identifying the network device or an attribute thereof thereby first-registering the subject-of-registration-device identification information to the device managing terminal unit; and collating the collating device identification information with the first-registered subject-of-registration-device identification information when the collating device identification information is inputted to the device managing terminal unit whereby the subject-of-registration-device identification information is second-registered when there is an agreement in a collation result.

Due to this, it is possible to obtain an effect equivalent to the device identification information managing method of the aspect 26.

DETAILED DESCRIPTION

Figure 1:
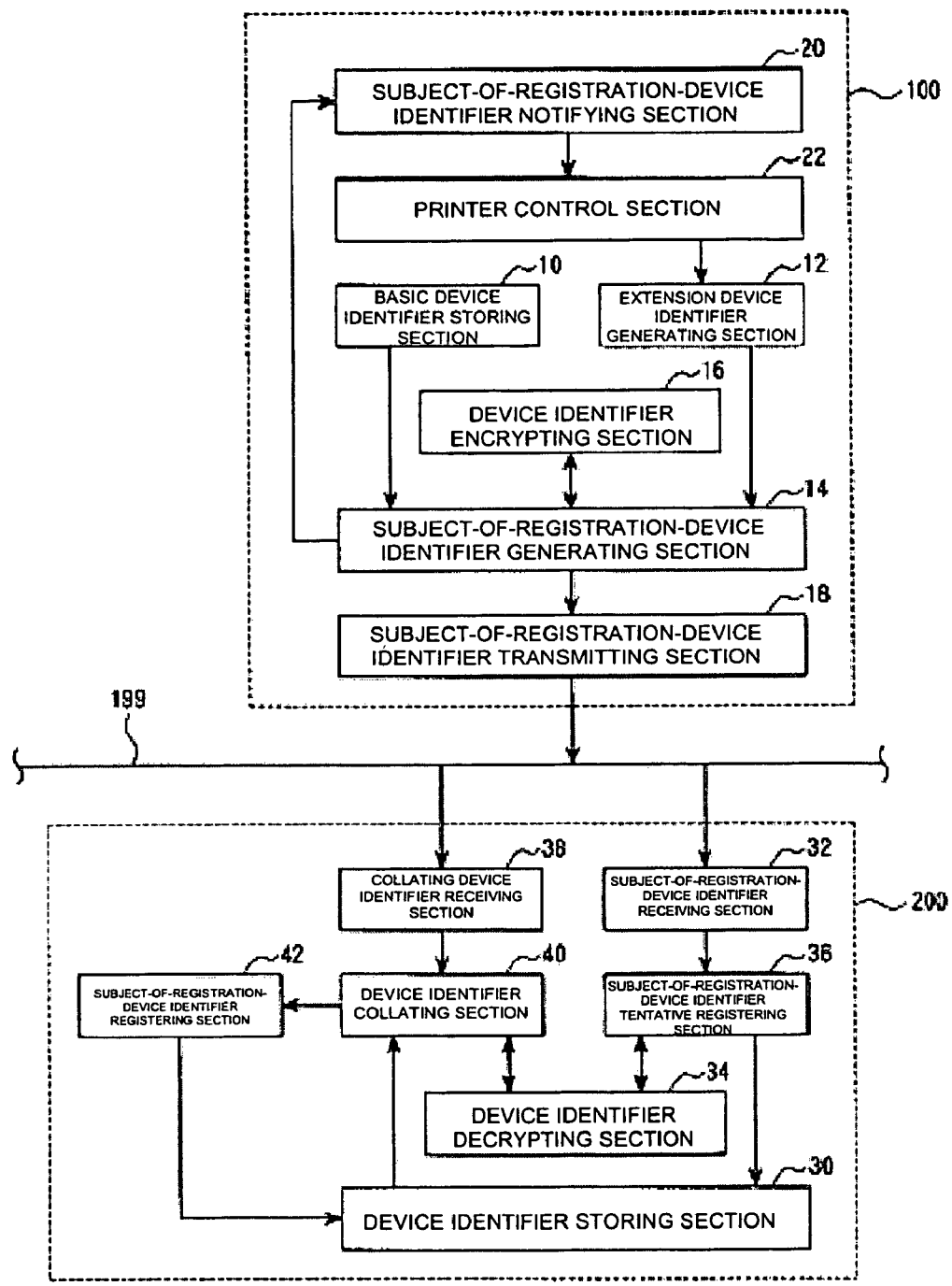
FIG. 1 is a functional block diagram showing a functional outline of a network system to which the present invention is applied.

Referring to the drawings, explanations will be now made to an embodiment of the present invention.

FIGS. 1 to 7 are figures illustrating an embodiment of a device identification information managing system, network device, device managing terminal unit, device and terminal-unit programs, and device identification information managing method according to the present invention.

This embodiment is an application of the device identification information managing system, network device, device managing terminal unit, device and terminal-unit programs, and device identification information managing method of the invention, to a case the device identifier of a network printer 100 is controlled by a printer managing server 200 as shown in FIG. 1.

Referring to FIG. 1, explanation is first made on the functional outline of a network system to which the invention is applied.

FIG. 1 is a functional block diagram showing the functional outline of the network system to which the invention is applied.

The internet 199 is connected with a network printer 100 and a printer managing server 200 serving to manage the network printer 100 as shown in FIG. 1. Note that, although the network printer 100 is shown only one in order to facilitate to understand the invention, a number of network printers 100 are actually connected to the Internet 199.

The network printer 100 is configured having a basic device identifier storing section 10 storing a basic device identifier unambiguously assigned to the network printer 100 concerned, an extension device identifier generating section 12 for generating an extension device identifier depending upon dynamic information, a subject-of-registration-device identifier generating section 14 for generating a subject-of-registration-device identifier comprising basic and extension device identifiers depending upon a basic device identifier of the basic device identifier storing section 10 and an extension device identifier generated by the extension device identifier generating section 12, and a device identifier encrypting section 16 for encrypting a device identifier provided.

The network printer 100 is further configured having a subject-of-registration-device identifier transmitting section 18 for sending a subject-of-registration-device identifier generated by the subject-of-registration-device identifier generating section 14 to the printer managing server 200, a subject-of-registration-device identifier notifying section 20 for notifying the user of a subject-of-registration-device identifier generated by the subject-of-registration-device identifier generating section 14, and a printer control section 22 for controlling the network printer 100.

The printer control section 22 is configured having a printing function to make a print depending upon printing data provided, a sys-up time count function to count a startup lapse time from a startup of the network printer 100 to the present time (hereinafter, referred to as sys-up time), and a total print count function to count the number of prints from a predetermined reference time to the present time (hereinafter, referred to as total print count).

The extension device identifier generating section 12 acquires a sys-up time and total print count from the printer control section 22 and generates an extension device identifier depending upon the acquired sys-up time and total print count.

The subject-of-registration-device identifier generating section 14 reads a basic device identifier out of the basic device identifier storing section 10 and generates a subject-of-registration-device identifier comprising the read-out basic device identifier and the extension device identifier generated by the extension device identifier generating section 12, to provide the generated subject-of-registration-device identifier to the device identifier encrypting section 16 where it is encrypted.

The subject-of-registration-device identifier transmitting section 18 sends the device identifier encrypted by the subject-of-registration-device identifier generating section 14 to the printer managing server 200.

The subject-of-registration-device identifier notifying section 20 makes use of the printing function of the printer control section 22, to print the subject-of-registration-device identifier generated by the subject-of-registration-device identifier generating section 14 thereby making a notification to the user.

The printer control server 200 is configured having a device identifier storing section 30 for storing a subject-of-registration-device identifier, a subject-of-registration-device identifier receiving section 32 for receiving a subject-of-registration-device identifier, a device identifier decrypting section 34 for decrypting an encrypted device identifier provided, and a subject-of-registration-device identifier tentative registering section (subject-of-registration-device identifier first-registering section) 36 for tentatively registering (first-registering) a subject-of-registration-device identifier received by the subject-of-registration-device identifier receiving section 32 to the device identifier storing section 30.

The printer managing server 200 is further configured further having a collating device identifier receiving section 38 for receiving a collating device identifier, a device identifier collating section 40 for collating between a collating device identifier received by the collating device identifier receiving section 38 and a subject-of-registration-device identifier of the device identifier storing section 30, and a subject-of-registration-device identifier registering section (subject-of-registration-device identifier second-registering section) 42 for registering (second-registering) a subject-of-registration-device identifier to the device identifier storing section 30 depending upon a collation result by the device identifier collating section 40.

The subject-of-registration-device identifier tentative registering section 36 delivers the encrypted device identifier received by the subject-of-registration-device identifier receiving section 32 to the device identifier decrypting section 34 where it is decrypted, and tentatively registers the decrypted subject-of-registration-device identifier to the device identifier storing section 30.

The device identifier collating section 40 delivers the encrypted device identifier received by the collating device identifier receiving section 38 to the device identifier decrypting section 34 where it is decrypted, and searches through the device identifier storing section 30 for a subject-of-registration-device identifier in agreement with the decrypted collating device identifier.

The subject-of-registration-device identifier registering section 42, when finding a subject-of-registration-device identifier in the device identifier collating section 40, registers the found-out subject-of-registration-device identifier to the device identifier storing section 30.

Figure 2:
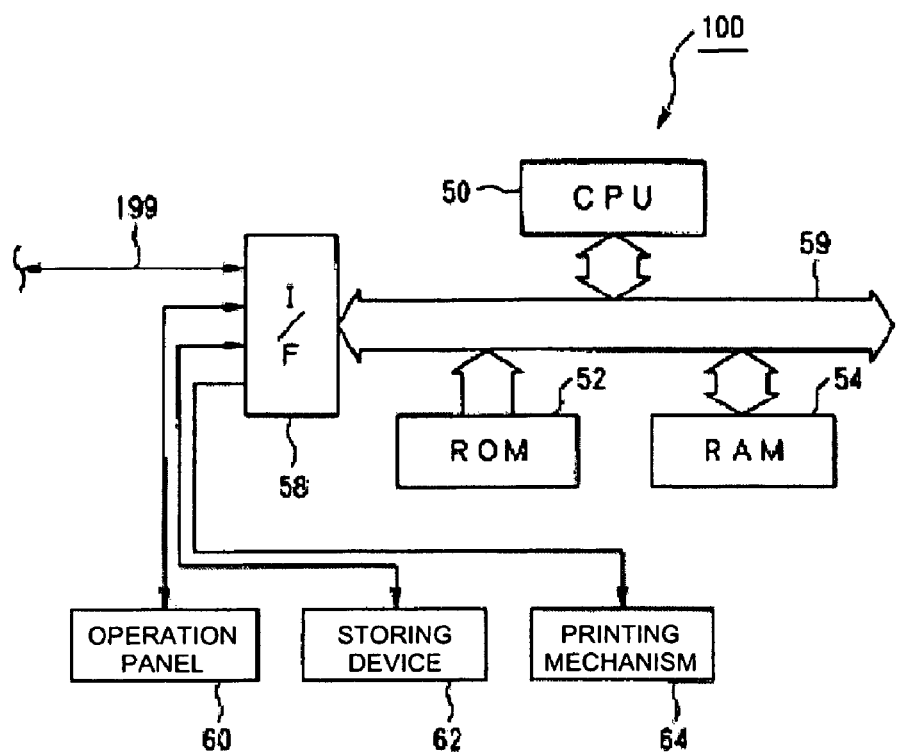
FIG. 2 is a block diagram showing a hardware configuration of a network printer 100.
Figure 3:
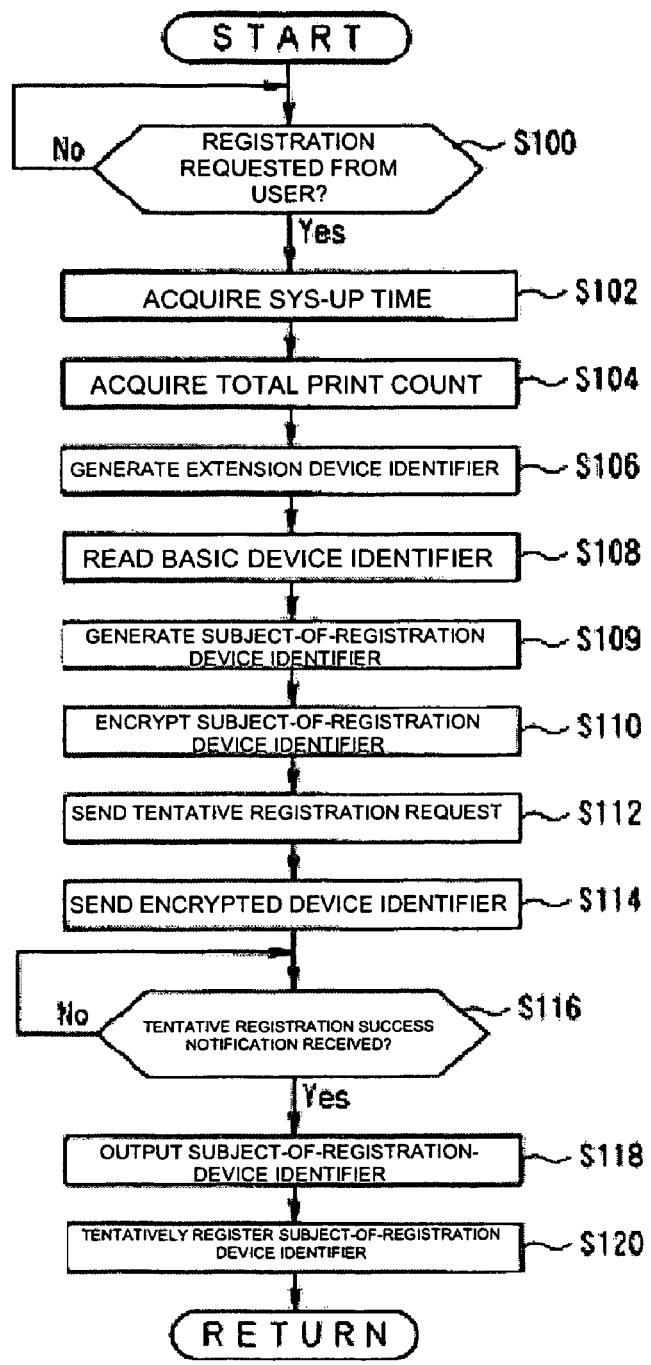
FIG. 3 is a flowchart showing a device identifier tentative registration request process.
Figure 4:
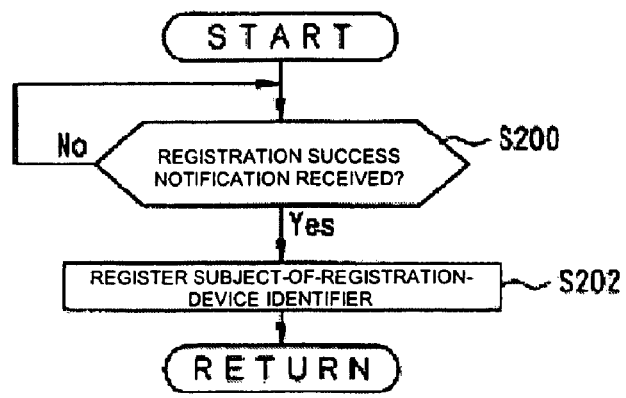
FIG. 4 is a flowchart showing a device identifier registering process to be executed at the network printer 100.

Referring to FIGS. 2 to 4, explanation is now made in detail on the configuration of the network printer 100.

FIG. 2 is a block diagram showing a hardware configuration of the network printer 100.

The network printer 100 is configured, as shown in FIG. 2, by a CPU 50 for controlling the operation and system overall according to a control program, a ROM 52 previously storing a control program, etc. for the CPU 50 in a predetermined domain, a RAM 54 for storing data read out of the ROM 52, etc. or an operation result required in the course of operation in the CPU 50, and an I/F 58 mediating to input/output data to/from external apparatuses. These are mutually connected for exchanging data through a bus 59 as a signal line for data transfer.

The I/F 58 is connected with, as external devices, an operation panel 60 as a human interface allowing to input/display data, a storage device 62 for storing data, table, etc. as files, a printing mechanism 64 made up by a head drive and other mechanisms required for printing and a signal line for connection to the Internet 199. Here, the storage device 62 is configured as a basic device identifier storing section 10.

The CPU 50 comprises a micro-processing unit (MPU) or the like, to start up a predetermined program stored in a predetermined domain of the ROM 52 and execute time-divisionally a device identifier tentative registration requesting process and device identifier registering process shown in the flowchart of FIGS. 3 and 4 according to the program.

Referring to FIG. 3, explanation is first made on the device identifier tentative registration (first-registration) requesting process.

FIG. 3 is a flowchart showing the device identifier tentative registration requesting process.

The device identifier tentative registration requesting process is a process to be realized as an extension device identifier generating section 12, a subject-of-registration-device identifier generating section 14, a device identifier encrypting section 16, a subject-of-registration-device identifier transmitting section 18 and a subject-of-registration-device identifier notifying section 20. When executed by the CPU 50, the process first moves to step S100 as shown in FIG. 3.

At step S100, it is determined whether or not a registration request from the user was inputted through the operation panel 60. When determined that a registration request was inputted from the user (Yes), the process moves to step S102. When not so determined (determined not) (No), the process waits at step S100 until a registration request is inputted from the user.

At step S102, a sys-up time is acquired and the process moves to step S104 where the total print count is acquired. The process moves to step S106 where an extension device identifier is generated on the basis of the acquired sys-up time and total print count, followed by movement to step S108.

At step S108, a basic device identifier is read out of the storage device 62. The process moves to step S109 where a subject-of-registration-device identifier is generated depending upon the read-out basic device identifier and generated extension device identifier. The process moves to step S110 where the generated subject-of-registration-device identifier is encrypted according to a predetermined encryption algorithm, followed by movement to step S112.

At step S112, to the printer managing server 200 is sent a tentative registration request as a request for tentatively registering the subject-of-registration-device identifier. The process moves to step S114 where the device identifier encrypted at step S110 is sent to the printer managing server 200, followed by movement to step S116.

At step S116, it is determined whether or not received a tentative-registration success notification representative of a successful tentative registration at the printer managing server 200. When determined that a tentative-registration success notification was received (Yes), the process moves to step S118 where the generated subject-of-registration-device identifier is printed by being outputted to the printing mechanism 64, followed by movement to step S120.

At step S120, the generated subject-of-registration-device identifier is tentatively registered to the storage device 62. Tentative registration of the subject-of-registration-device identifier is made, for example, by registering a tentative registration flag through a correspondence to the subject-of-registration-device identifier. After ending the process of step S120, the process in series is terminated for return to the former process.

Meanwhile, when determined at step S116 that a tentative-registration success notification was not received (No), the process waits at step S116 until a tentative-registration success notification is received.

Referring to FIG. 4, explanation is now made on the device identifier registering (second-registering) process.

FIG. 4 is a flowchart showing the device identifier registering process to be executed at the network printer 100.

The device identifier registering process is a process of regularly registering (second-registering) a tentatively registered subject-of-registration-device identifier to the storage device 62. When it is executed in the CPU 50, the process first moves to step S200 as shown in FIG. 4.

At step S200, it is determined whether or not received a registration success notification representative of a successful registration at the printer managing server 200. When determined that a registration success notification was received (Yes), the process moves to step S202. When not so determined (No), the process waits at step S200 until a registration success notification is received.

At step S202, the tentatively registered subject-of-registration-device identifier is registered to the storage device 62. Tentative registration of the subject-of-registration-device identifier is made, for example, by registering a registered flag through a correspondence to the subject-of-registration-device identifier. After ending the process of step S202, the process in series is terminated for return to the former process.

Figure 5:
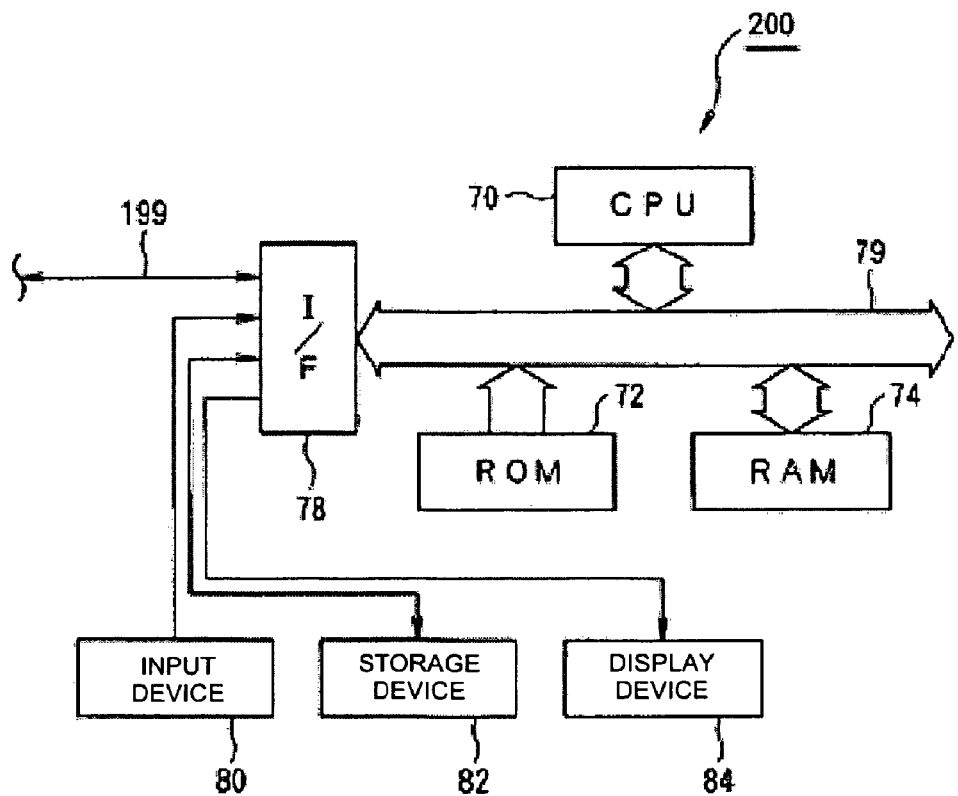
FIG. 5 is a block diagram showing a hardware configuration of a printer managing server 200.
Figure 6:
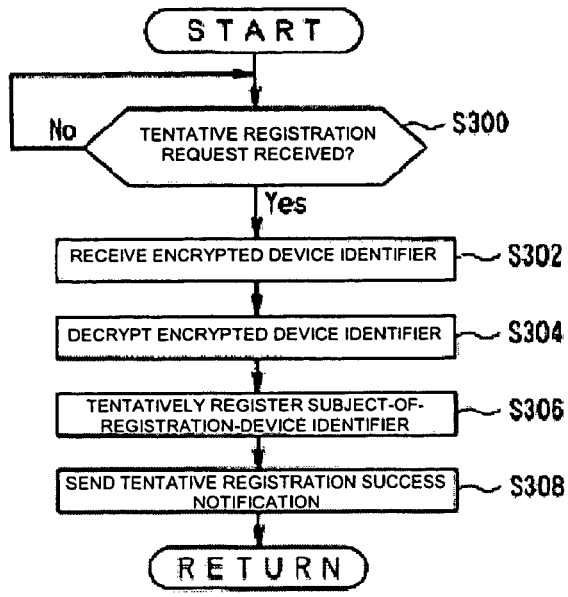
FIG. 6 is a flowchart showing a device identifier tentative registering process.
Figure 7:
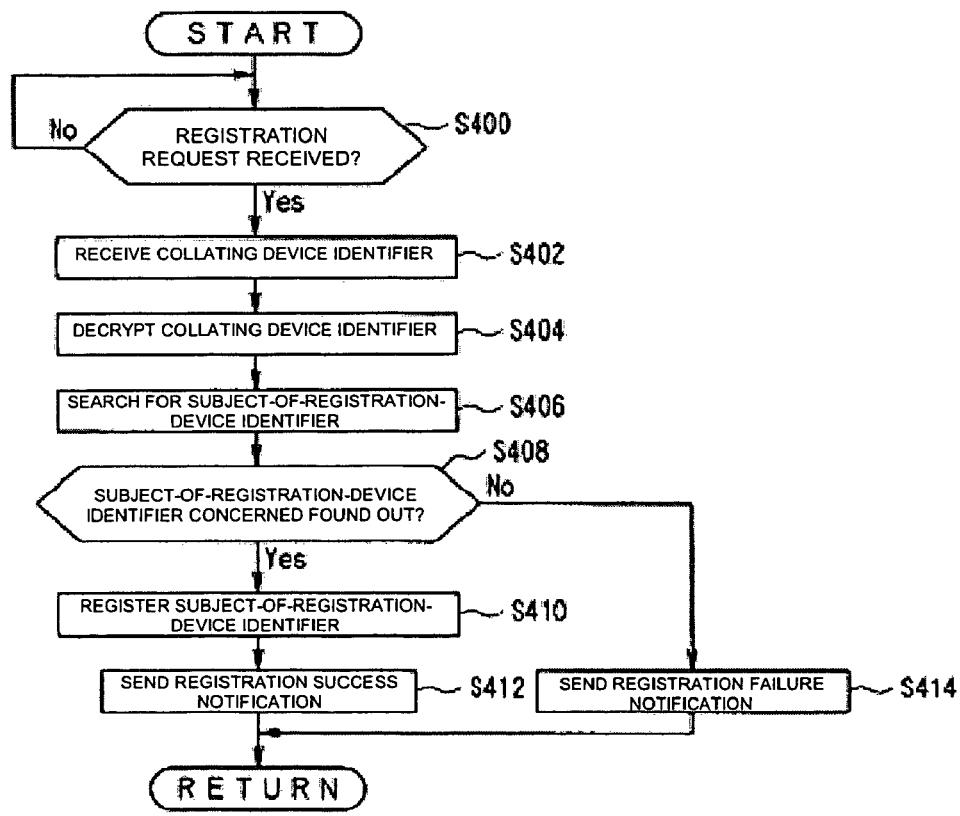
FIG. 7 is a flowchart showing a device identifier registering process to be executed at the printer managing server 200.

Referring to FIGS. 5 to 7, explanation is now made in detail on the configuration of the printer managing server 200.

FIG. 5 is a block diagram showing a hardware configuration of the printer managing server 200.

The printer managing server 200 is constructed, as shown in FIG. 5, by a CPU 70 for control of operation and system overall according to a control program, a ROM 72 previously storing a control program, etc. for the CPU 70 in a predetermined domain, a RAM 74 for storing data read out of the ROM 72, etc. or an operation result required in the course of operation in the CPU 70, and an I/F 78 mediating to input/output data to/from external apparatuses. These are mutually connected for exchange of data through a bus 79 as a signal line for data transfer.

The I/F 78 is connected, as external devices, with an input device 80, such as a keyboard or a mouse, as a human interface for inputting/displaying data, a storage device 82 for storing data, table and the like as files, a display device 84 for displaying a screen on the basis of an image signal, and a signal line for connection to the Internet 199. Here, the storage device 82 is configured as a device identifier storing section 30.

The CPU 70 comprises a micro-processing unit (MPU) or the like, to start up a predetermined program stored in a predetermined domain of the ROM 72 and execute time-divisionally a device identifier tentative registering process and device identifier registering process shown in the flowcharts of FIGS. 6 and 7 according to the program.

Referring to FIG. 6, explanation is first made on the device identifier tentative registering process.

FIG. 6 is a flowchart showing a device identifier tentative registering process.

The device identifier tentative registering process is a process to be realized as a subject-of-registration-device identifier receiving section 32, a device identifier decrypting section 34, and a subject-of-registration-device identifier tentative registering section 36. When it is executed in the CPU 70, the process first moves to step S300 as shown in FIG. 6.

At step S300, it is determined whether or not a tentative registration request was received. When determined that a tentative registration request was received (Yes), the process moves to step S302. When not so determined (No), the process waits at step S300 until a tentative registration request is received.

At step S302, an encrypted device identifier is received. The process moves to step S304 where the received encrypted device identifier is decrypted according to a predetermined decryption algorithm, followed by movement to step S306.

At step S306, the decrypted subject-of-registration-device identifier is tentatively registered to the storage device 82. Tentative registration of the subject-of-registration-device identifier is made, for example, by registering a network address of the network printer 100 and tentative registration flag by means of a correspondence to the subject-of-registration-device identifier.

Then, the process moves to step S308 where the tentative registration success notification is sent to the network printer 100 that has made the tentative registration request. The process in series is then ended for return to the former process.

Referring to FIG. 7, explanation is now made in detail on the device identifier registering process.

FIG. 7 is a flowchart showing a device identifier registering process to be executed at the printer managing server 200.

The device identifier registering process is a process to be realized as a collating device identifier receiving section 38, a device identifier decrypting section 34, a device identifier collating section 40 and a subject-of-registration-device identifier registering section 42. When it is executed in the CPU 70, the process first moves to step S400 as shown in FIG. 7.

At step S400, it is determined whether or not received a registration request as a request to register a subject-of-registration-device identifier. When determined that a registration request was received (Yes), the process moves to step S402. When not so determined (No), the process waits at step S400 until a registration request is received.

At step S402, received is a collating device identifier encrypted according to a predetermined encryption algorithm. The process moves to step S404 where the received collating device identifier is decrypted according to a predetermined decryption algorithm, followed by movement to step S406.

At step S406, search is made through the storage device 82 for a subject-of-registration-device identifier in agreement with the decrypted collating device identifier. The process moves to step S408 where it is determined whether or not a subject-of-registration-device identifier concerned was found out. When determined that a subject-of-registration-device identifier concerned was found out (Yes), the process moves to step S410.

At step S410, the subject-of-registration-device identifier thus found is registered to the storage device 82. Registration of the subject-of-registration-device identifier is to be made, for example, by registering a registered flag with a correspondence to the subject-of-registration-device identifier.

Then, the process moves to step S412 where a registration success notification is sent to the source of the registration request and to the network printer 100, followed by terminating the process in series for return to the former process.

Meanwhile, when it is determined at step S408 that a subject-of-registration-device identifier was not found out (No), the process moves to step S414 where to send a registration failure notification representative of a failure of registration at the printer managing server 200 to the source of the registration request, followed by terminating the process in series for return to the former process.

Explanation is now made on the operation of the present embodiment.

First explained is the case of tentatively registering (first-registering) a device identifier.

In the case of tentatively registering a device identifier, the user at the network printer 100 makes a request of registration.

At the network printer 100, when requested a registration from the user, a sys-up time and total print count is acquired through steps S102-S106, to generate an extension device identifier depending upon the acquired sys-up time and total print count. Meanwhile, through step S108, a basic device identifier is read out of the storage device 62. Then, through steps S109, S110, a subject-of-registration-device identifier is generated based upon the read-out basic device identifier and the generated extension device identifier, thus encrypting the generated subject-of-registration-device identifier. Then, through steps S112, S114 the encrypted device identifier is sent together with a tentative registration request to the printer managing server 200.

At the printer managing server 200, when the encrypted device identifier is received together with the tentative registration request, the received encrypted device identifier is decrypted through steps S304, S306. The decrypted subject-of-registration-device identifier is tentatively registered to the storage device 82. After completing the tentative registration, a tentative registration success notification is sent to the network printer 100 through step S308.

At the network printer 100, when the tentative registration success notification is received, the generated subject-of-registration-device identifier is outputted to the printing mechanism 64 through step S118 and the subject-of-registration-device identifier is printed by the printing mechanism 64. Meanwhile, through step S120, the generated subject-of-registration-device identifier is tentatively registered to the storage device 62.

Explanation is now made on the case of regularly registering (second-registering) a device identifier.

In the case of registering a device identifier, the user first acquires a paper sheet printed with a subject-of-registration-device identifier from the network printer 100. Then, the user at a PC, etc. for connection to the Internet 199 makes an access to the printer managing server 200 through a browser or the like, to input the subject-of-registration-device identifier printed on the acquired paper sheet as a collating device identifier to a predetermined input form. At this time, the collating device identifier thus inputted is encrypted with SSL (Secure Socket Layer) or the like by the browser or the like, etc. and then sent together with a registration request to the printer managing server 200.

At the printer managing server 200, when the collating device identifier is received together with the registration request, the received collating device identifier is decrypted through steps S404, S406. The storage device 82 is searched through for a subject-of-registration-device identifier in agreement with the decrypted collating device identifier. As a result, when a subject-of-registration-device identifier concerned is found out, the subject-of-registration-device identifier thus found is registered to the storage device 82 through step S410. After completing the registration, a registration success notification is sent to the PC, etc. and to the network printer 100 through step S412.

At the network printer 100, when the registration success notification is received, the tentatively registered subject-of-registration-device identifier is registered to the storage device 62 through step S202.

In this manner, through two procedures of tentative registration and registration, the printer managing server 200 and the network printer 100 are allowed to make use of a device identifier in providing a network service. The printer managing server 200, during communication confirms a device identifier with the network printer 100 prior to providing a network service, to thereby determine eligibility (whether or not eligible) for enjoying a network service provided.

In this manner, in this embodiment, the network printer 100 is adapted to generate an extension device identifier depending upon dynamic information and a subject-of-registration-device identifier including the basic device identifier of the storage device 62 and the generated extension device identifier, thereby sending the generated subject-of-registration-device identifier to the printer managing server 200 and notifying the user. The printer managing server 200, when receiving the subject-of-registration-device identifier, tentatively registers (first-registers) the received subject-of-registration-device identifier to the storage device 82. When receiving a collating identifier, it collates between the received collating device identifier and the subject-of-registration-device identifier of the storage device 82, thereby regularly registering (second-registering) the subject-of-registration-device identifier to the storage device 82 depending upon the collation result.

This allows to make use of the subject-of-registration-device identifier including the extension device identifier generated based upon dynamic information besides the basic device identifier. Accordingly, should the basic device identifier be known to the third person, there can be a reduced possibility for the third person to fake and illicitly use a subject-of-registration-device identifier.

Meanwhile, it is difficult for a third person to be notified of a subject-of-registration-device identifier. Furthermore, the subject-of-registration-device identifier cannot be registered unless the subject-of-registration-device identifier is inputted to the printer managing server 200. Thus, there is a reduced possibility of registering a subject-of-registration identifier without relying upon a user's intention. Therefore, device identifiers can be handled comparatively securely as compared to conventional techniques.

Furthermore, in the present embodiment, the network printer 100 is adapted to generate an extension device identifier based upon sys-up time.

This makes it difficult to fake an extension device identifier, hence further reducing the possibility for the third person to fake and illicitly use a subject-of-registration-device identifier. Therefore, device identifiers can be handled further securely.

Furthermore, in the present embodiment, the network printer 100 is adapted to generate an extension device identifier based upon the total print count.

This makes it difficult to fake an extension device identifier, hence further reducing the possibility for the third person to fake and illicitly use a subject-of-registration-device identifier. Therefore, device identifiers can be handled further securely.

Furthermore, in the present embodiment, the network printer 100 is adapted to notify a subject-of-registration-device identifier by the utilization of the printing function of the printing mechanism 64.

Due to this, because of merely utilizing the printing function of the network printer 100, it is comparatively easy to notify a subject-of-registration-device identifier.

Furthermore, in the present embodiment, the network printer 100 is adapted to encrypt a subject-of-registration-device identifier and sends an encrypted device identifier to the printer managing server 200. The printer managing server 200 is adapted to decrypt a received encrypted device identifier and tentatively register a decrypted subject-of-registration-device identifier to the storage device 82.

This allows to transfer a subject-of-registration-device identifier by means of cipher communication at between the network printer 100 and the printer managing server 200. Should a subject-of-registration-device identifier be stolen in the course of communication, there can be a reduced possibility that the third person illicitly uses a subject-of-registration-device identifier. Therefore, device identifiers can be handled comparatively securely.

Furthermore, in the present embodiment, the printer managing server 200 is adapted to decrypt a received collating device identifier and collates between a decrypted collating device identifier and a subject-of-registration-device identifier of the storage device 82.

This allows to input a collating device identifier by means of encryption. Should a collating device identifier be stolen in the course of input, there can be a reduced possibility for the third person to illicitly use the collating device identifier. Therefore, device identifiers can be handled further securely.

In the above embodiment, the network printer 100 corresponds to the network device of the aspect 1 to 6, 8 to 14, 23, 26 to 31 while the basic device identifier storing section 10 and storage device 62 correspond to the basic device identification information storage means of the aspect 1, 8, 17 or 26.

Meanwhile, the printing mechanism 64 corresponds to the output means of aspect 4, 5, 11, 12, 20, 21, 29 or 30 while the extension device identifier generating section 12 and step S106 correspond to the extension device identification information generating means of aspect 1 to 4, 8 to 11, 17 to 20.

Meanwhile, in the above embodiment, step S106 corresponds to the extension device identification information generating step of aspect 26 to 29, the device identifier encrypting section 16 and step S110 correspond to the subject-of-registration-device identification information encrypting means of aspect 6, 13 or 22, and step S110 corresponds to the subject-of-registration-device identification information encrypting step of aspect 31.

Meanwhile, the subject-of-registration-device identifier transmitting section 18 and step S114 correspond to the subject-of-registration-device identification information transmitting means of aspect 1, 6, 8, 13, 17 or 22 while step S114 corresponds to the subject-of-registration-device identification information transmitting step of aspect 26 or 31.

Meanwhile, in the above embodiment, the subject-of-registration-device identifier notifying section 20 and step S118 correspond to the subject-of-registration-device identification information notifying means of aspect 1, 5, 8, 12, 17 or 21 while step S118 corresponds to the subject-of-registration-device identification information notifying step of aspect 26 or 30.

Meanwhile, the printer managing server 200 corresponds to the device managing terminal unit of aspect 1, 6 to 8, 13 to 17, 22, 26, 31 or 32 while the device identifier storing section 30 and storage device 82 correspond to the tentative registering (first-registering) storage means of aspect 1, 6, 7, 14 to 16, 23 to 26, 31 or 32 or to the subject-of-registration-device identification information storage means of aspect 1, 14, 23 or 26.

Meanwhile, in the above embodiment, the subject-of-registration-device identifier receiving section 32 and step S302 correspond to the subject-of-registration-device identification information receiving means of aspect 1, 6, 14, 15, 23 or 24 while step S302 corresponds to the subject-of-registration-device identification information receiving step of aspect 26 or 31.

Meanwhile, the device identifier decrypting section 34 and step S304 correspond to the subject-of-registration-device identification information decrypting means of aspect 6, 15 or 24, step S304 corresponds to the subject-of-registration-device identification information decrypting step of aspect 31, and the subject-of-registration-device identifier tentative registering (first-registering) section 36 and step S306 correspond to the subject-of-registration-device identification information tentative registering (first-registering) means of aspect 1, 6, 14, 15, 23 or 24.

Meanwhile, in the above embodiment, step S306 corresponds to the subject-of-registration-device identification information tentative registering (first-registering) step of aspect 26 or 31 while the collating device identifier receiving section 38 and step S402 correspond to the collating device identification information input means of aspect 1, 7, 14, 16, 23 or 25. Meanwhile, step S402 corresponds to the collating device identification information input step of aspect 26 or 32, the device identifier decrypting section 34 and step S404 correspond to the collating device identification information decrypting means of aspect 7, 16 or 25, and step S404 corresponds to the collating device identification information decrypting step of aspect 32.

Meanwhile, in the above embodiment, the device identifier collating section 40 and step S406 correspond to the device identification information collating means of aspect 1, 7, 14, 16, 23 or 25, step S406 corresponds to the device identification information collating step of aspect 26 or 32, and the subject-of-registration-device identifier registering (second-registering) section 42 and step S408, S410 correspond to the subject-of-registration-device identification information registering (second-registering) means of aspect 1, 14 or 23.

Meanwhile, steps S408, S410 correspond to the subject-of-registration-device identification information registering (second-registering) step of aspect 26.

Incidentally, the above embodiment was configured to manage the network printer 100. However, this is not limiting, i.e., it can be configured to manage, as network devices, network-compatible projectors, scanners, digital cameras, digital video cameras, personal computers, PDAs (Personal Digital Assistants), network storages, audio appliances, cellular phones, PHSs (registered trademark) (Personal Handyphone Systems), watch-type PDAs, STBs (Set Top Boxes), POS (Point Of Sale) terminal units, copiers, FAX machines, telephones (including IP telephones), exchanges, NCUs (Network Control Units), routers, hubs, bridges or other network-compatible appliances.

Figure 8:
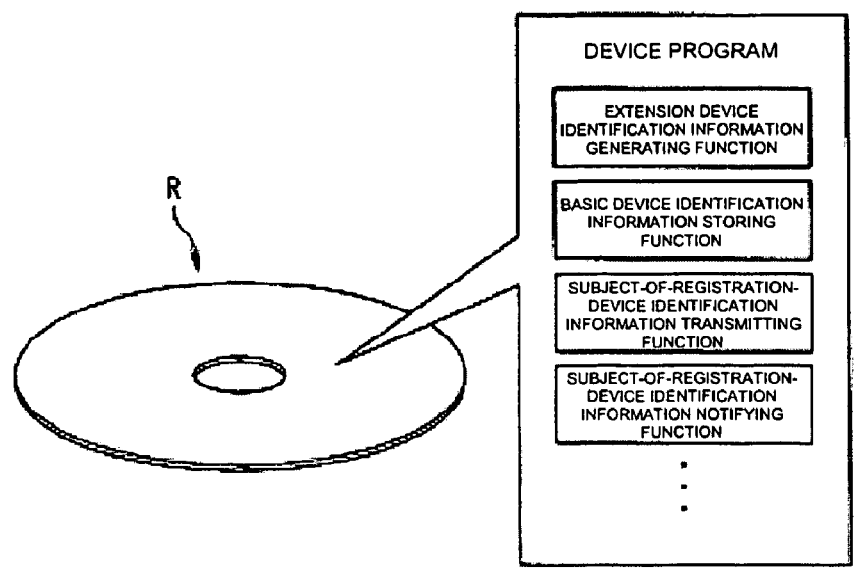
FIG. 8 is a figure showing one example of a storage medium recording a device program of the invention.

Meanwhile, the above embodiment explained on the case to execute the control program previously stored in the ROM 52 when executing the process shown in the flowcharts of FIGS. 3 and 4. However, this is not limiting, i.e., as shown in FIG. 8, from a storage medium R such as a CD-ROM storing a program indicating those procedures, the program (program for a device in the illustrated example) may be read in a RAM 54 and executed.

Meanwhile, in the above embodiment, explanation was on the case to execute the control program previously stored in the ROM 72 when executing the process shown in the flowcharts of FIGS. 6 and 7. However, this is not limiting, i.e., from a storage medium storing a program indicating those procedures, the program (program for a device in the illustrated example) may be read in a RAM 74 and executed.

Here, the storage medium is a semiconductor storage medium such as a RAM or ROM, a magnetic storage medium such as an FD or an HD, an optical-reading-schemed storage medium such as a CD, a CDV, an LD or a DVD or magnetic-storing-type/optical-reading-schemed storage medium such as an MO, including any of storage mediums provided that can be read by a computer regardless of the reading method of electronic, magnetic, optical or the like.

Meanwhile, in the above embodiment, explanation was on the case that the device identification information managing system, network device, device managing terminal unit, device and terminal-unit programs and device identification information managing method of the invention are applied to the network system comprising the Internet 199. However, this is not limiting, i.e., application can be to a so-called intranet for communication under the same scheme as the Internet 199. Of course, application can be to the usual network without limitation to the network for communication under the same scheme as the Internet 199.

Meanwhile, in the above embodiment, explanation was on the case that, for the device identification information managing system, network device, device managing terminal unit, device and terminal-unit programs and device identification information managing method of the invention, the device identifier of the network printer 100 is managed by the printer managing server 200 as shown in FIG. 1. However, this is not limiting, i.e., application can be to other cases within the scope not departing from the gist of the invention.

What is claimed is:

1. A device identification information managing system for communicably connecting between a network device and a device managing terminal unit that manages the network device, and managing device identification information to identify any network device, the device identification information managing system comprising:

the network device which includes:
   a basic device identification information storage unit storing basic device identification information to identify the network device;
   an extension device identification information generator generating extension device identification information to identify the network device based on dynamic information, the dynamic information including a startup lapse time from a startup of the network device to a present time and an output amount corresponding to an amount of output from a predetermined reference time to the present time;
   a subject-of-registration-device identification information transmitter sending subject-of-registration-device identification information including the basic device identification information of the basic device identification information storage unit and the extension device identification information generated by the extension device identification information generator to the device managing terminal unit; and
   a subject-of-registration-device identification information notifying unit notifying a user of the subject-of-registration-device identification information by printing the subject-of-registration-device identification information on a paper sheet; and the device managing terminal unit which includes:
   a subject-of-registration-device identification information receiver receiving the subject-of-registration-device identification information from the subject-of-registration-device identification information transmitter;
   a subject-of-registration-device identification information first-register storing the subject-of-registration-device identification information received by the subject-of-registration-device identification information receiver to a first-registering storage unit;
   a collating device identification information receiver that receives collating device identification information that is inputted by the user at a PC through a browser and communicated to the collating device identification information receiver, the user having acquired the collating device identification information, prior to inputting, from the paper sheet printed by the subject-of-registration-device identification notifying unit;
   a device identification information collator collating between the collating device identification information received by the collating device identification information receiver and the subject-of-registration-device identification information received by the subject-of-registration-device identification receiver and stored in the first-registering storage unit to determine whether the collating device identification information is found in the first-registering storage unit; and
   a subject-of-registration-device identification information second-register registering the subject-of-registration-device identification information by storing the subject-of-registration-device identification information in a subject-of-registration-device identification information storage unit when a collation result by the device identification information collator indicates that the collating device identification information is found in the first-registering storage unit;
   the device managing terminal unit managing the network device when the subject-of-registration-device identification information for the network device is registered by the subject-of-registration-device identification information second-register.

2. A device identification information managing system according to claim 1, wherein:
   the network device further has a subject-of-registration-device identification information encryptor encrypting the subject-of-registration-device identification information;
   the subject-of-registration-device identification information transmitter sending device identification information encrypted by the subject-of-registration-device identification information encryptor to the device managing terminal unit;
   the device managing terminal unit further comprising a subject-of-registration-device identification information decryptor decrypting encrypted device identification information received by the subject-of-registration-device identification information receiver; and
   the subject-of-registration-device identification information first-register registers subject-of-registration-device identification information decrypted by the subject-of-registration-device identification information decryptor to the first-registering storage unit.

3. A device identification information managing system according to claim 1, wherein:
   the device managing terminal unit further comprises a collating device identification information decryptor decrypting collating device identification information received by the collating device identification information receiver; and
   the device identification information collator collates between collating device identification information decrypted by the collating device identification information decryptor and subject-of-registration-device identification information of the first-registering storage unit.

4. A network device for communicable connection to a device managing terminal unit, the network device comprising:
   a basic device identification information storage unit storing basic device identification information to identify the network device;
   an extension device identification information generator generating extension device identification information to identify the network device depending upon dynamic information, the dynamic information including a startup lapse time from a startup of the network device to a present time and an output amount corresponding to an amount of output from a predetermined reference time to the present time;
   a subject-of-registration-device identification information transmitter sending subject-of-registration-device identification information including basic device identification information of the basic device identification information storage unit and extension device identification information generated by the extension device identification information generator to the device managing terminal unit; and a subject-of-registration-device identification information notifier notifying a user of the subject-of-registration-device identification information by printing the subject-of-registration-device identification information on a paper sheet.

5. A device managing terminal unit for communicable connection to a network device and managing the network device, the terminal unit comprising:

a subject-of-registration-device identification information receiver receiving subject-of-registration-device identification information;

a subject-of-registration-device identification information first-register registering the subject-of-registration-device identification information received by the subject-of-registration-device identification information receiver to a first-registering storage unit;

a collating device identification information receiver that receives collating device identification information that is inputted by a user at a PC through a browser and communicated to the collating device identification information receiver, the user having acquired the collating device identification information, prior to inputting, from a paper sheet printed by the network device;

a device identification information collator collating between the collating device identification information received by the collating device identification information receiver and subject-of-registration-device identification information received by the subject-of-registration-device identification information receiver and stored in the first-registering storage unit to determine whether the collating device identification information is found in the first-registering storage unit; and a subject-of-registration-device identification information second-register registering the subject-of-registration-device identification information by storing the subject-registration-device identification information in a subject-of-registration-device identification information storage unit when a collation result by the device identification information collator indicates that the collating device identification information is found in the first-registering storage unit.

6. A device program, stored in a computer readable medium, for a computer communicably connected to a device managing terminal unit to execute, the program being for executing a process to be realized as:

an extension device identification information generating step of generating extension device identification information to identify the computer depending upon dynamic information, the dynamic information including a startup lapse time from a startup of the computer to a present time and an output amount corresponding to an amount of output from a predetermined reference time to the present time;

a subject-of-registration-device identification information transmitting step of sending subject-of-registration-device identification information including basic device identification information of a basic device identification information storing step storing basic device identification information to identify the computer and extension device identification information generated by the extension device identification information generating step to the device managing terminal unit; and a subject-of-registration-device identification information notifying step of notifying a user of the subject-of-registration-device identification information by printing the subject-of-registration-device identification information on a paper sheet.

7. A terminal unit program, stored in a computer readable medium, for a computer communicably connected to a network device and for managing the network device to execute, the program being for executing a process to be realized as:

a subject-of-registration-device identification information receiving step of receiving subject-of-registration-device identification information;

a subject-of-registration-device identification information first-registering step of registering the subject-of-registration-device identification information received by the subject-of-registration-device identification information receiving step to a first-registering storage unit;

a collating device identification information receiving step of receiving collating device identification information that is inputted by a user at a PC through a browser and communicated to a collating device identification receiver, the user having acquired the collating device identification information, prior to inputting, from a paper sheet printed by a subject-of-registration-device identification notifying unit;

a device identification information collating step of collating between the collating device identification information received by the collating device identification information receiving step and subject-of-registration-device identification information of the subject-of-registration-device identification information first-registering storing step to determine whether the collating device identification information is found in the first-registering storage unit; and a subject-of-registration-device identification information second-registering step of registering the subject-of-registration-device identification information to a subject-of-registration-device identification information storage unit when a collation result by the device identification information collating step indicates that the collating device identification information is found in the first-registering storage unit.

8. A device identification information managing method for communicably connecting between a network device and a device managing terminal unit that manages the network device, and managing device identification information to identify any network device and an attribute of the network device, the method comprising:

for the network device:

an extension device identification information generating step of generating extension device identification information to identify the network device depending upon dynamic information the dynamic information including a startup lapse time from a startup of the network device to a present time and an output amount corresponding to an amount of output from a predetermined reference time to the present time;

a subject-of-registration-device identification information transmitting step of sending subject-of-registration-device identification information including basic device identification information of a basic device identification information storage unit storing the basic device identification information to identify the network device and extension device identification information generated by the extension device identification information generating step to the device managing terminal unit; and a subject-of-registration-device identification information notifying step of notifying a user of the subject-of-registration-device identification information by printing the subject-of-registration-device identification information on a rarer sheet; and for the device managing terminal unit:

a subject-of-registration-device identification information receiving step of receiving the subject-of-registration-device identification information;

a subject-of-registration-device identification information first-registering step of storing the subject-of-registration-device identification information received by the subject-of-registration-device identification information receiving step to a first-registering storing unit;

a collating device identification information receiving step of receiving collating device identification information that is inputted by the user at a PC through a browser, the user having acquired the collating device identification information, prior to inputting, from the paper sheet printed by the subject-of-registration-device identification information notifying step;

a device identification information collating step of collating between the collating device identification information receiving by the collating device identification information receiving step and subject-of-registration-device identification information of the first-registering storing unit to determine whether the collating device identification information is found in the first-registering storing unit; and a subject-of-registration-device identification information second-registering step of registering the subject-of-registration-device identification information to a subject-of-registration-device identification information storage unit when a collation result by the device identification information collating step indicates that the collating device identification information is found in the first-registering storing unit.

* * * * *